(12) United States Patent
Priedeman, Jr.

(10) Patent No.: US 7,314,591 B2
(45) Date of Patent: ***Jan. 1, 2008

(54) METHOD FOR THREE-DIMENSIONAL MODELING

(75) Inventor: William R. Priedeman, Jr., Long Lake, MN (US)

(73) Assignee: Stratasys, Inc., Eden Prairie, MN (US)

( * ) Notice: Subject to any disclaimer, the term of this patent is extended or adjusted under 35 U.S.C. 154(b) by 917 days.

This patent is subject to a terminal disclaimer.

(21) Appl. No.: 10/187,323

(22) Filed: Jul. 1, 2002

(65) Prior Publication Data

US 2003/0004600 A1 Jan. 2, 2003

Related U.S. Application Data

(63) Continuation-in-part of application No. 09/854,220, filed on May 11, 2001, now Pat. No. 6,645,412.

(51) Int. Cl.
*B29C 41/02* (2006.01)

(52) U.S. Cl. ....................................... 264/308
(58) Field of Classification Search ................. 264/308
See application file for complete search history.

(56) References Cited

U.S. PATENT DOCUMENTS

| | | | |
|---|---|---|---|
| 3,016,451 A | 1/1962 | Cornell |
| 3,381,812 A | 5/1968 | Cohen |
| 3,841,000 A | 10/1974 | Simon |
| 3,917,090 A | 11/1975 | Montagnino |
| 4,152,367 A | 5/1979 | Binsack et al. |
| 4,575,330 A | 3/1986 | Hull |
| 4,665,492 A | 5/1987 | Masters |
| 4,749,347 A | 6/1988 | Valavaara |
| 4,844,373 A | 7/1989 | Fike, Sr. |
| 4,898,314 A | 2/1990 | Stroh |
| 4,928,897 A | 5/1990 | Satou et al. |
| 4,961,154 A | 10/1990 | Pomerantz et al. |
| 5,031,120 A | 7/1991 | Pomerantz et al. |
| 5,059,266 A | 10/1991 | Yamane et al. |

(Continued)

FOREIGN PATENT DOCUMENTS

WO    WO 00/62994    10/2000

(Continued)

OTHER PUBLICATIONS

Paper entitled "High Temperature Fused Deposition Modelling: An Experimental Study Focusing on Modelling Materials", by F.K. Feenstra, from Time-Compression Technologies '98 Conference (Oct. 13-14, 1998, Nottingham, U.K.).

*Primary Examiner*—Leo B. Tentoni
(74) *Attorney, Agent, or Firm*—Kinney & Lange, P.A.

(57) ABSTRACT

A three-dimensional model and its support structure are built by fused deposition modeling techniques, wherein a thermoplastic material containing silicone is used to form the support structure and/or the model. The thermoplastic material containing silicone exhibits good thermal stability, and resists build-up in the nozzle of an extrusion head or jetting head of a three-dimensional modeling apparatus. The silicone contained in a support material acts as a release agent to facilitate removal of the support structure from the model after its completion.

24 Claims, 1 Drawing Sheet

U.S. PATENT DOCUMENTS

| | | | |
|---|---|---|---|
| 5,121,329 A | 6/1992 | Crump | |
| 5,134,569 A | 7/1992 | Masters | |
| 5,136,515 A | 8/1992 | Helinski | |
| 5,140,937 A | 8/1992 | Yamane et al. | |
| 5,149,548 A | 9/1992 | Yamane et al. | |
| 5,169,081 A | 12/1992 | Goedderz | |
| 5,204,055 A | 4/1993 | Sachs et al. | |
| 5,216,616 A | 6/1993 | Masters | |
| 5,257,657 A | 11/1993 | Gore | |
| 5,263,585 A | 11/1993 | Lawhon et al. | |
| 5,293,996 A | 3/1994 | Duncan | |
| 5,303,141 A | 4/1994 | Batchelder et al. | |
| 5,312,224 A | 5/1994 | Batchelder et al. | |
| 5,340,433 A | 8/1994 | Crump | |
| 5,402,351 A | 3/1995 | Batchelder et al. | |
| 5,418,112 A | 5/1995 | Mirle et al. | |
| 5,434,196 A | 7/1995 | Ohkawa et al. | |
| 5,474,719 A | 12/1995 | Fan et al. | |
| 5,503,785 A | 4/1996 | Crump et al. | |
| 5,587,913 A | 12/1996 | Abrams et al. | |
| 5,594,652 A | 1/1997 | Penn et al. | |
| 5,690,865 A | 11/1997 | Kindt-Larsen et al. | |
| 5,695,707 A | 12/1997 | Almquist et al. | |
| 5,738,817 A | 4/1998 | Danforth et al. | |
| 5,764,521 A | 6/1998 | Batchelder et al. | |
| 5,765,740 A | 6/1998 | Ferguson | |
| 5,807,437 A | 9/1998 | Sachs et al. | |
| 5,866,058 A | 2/1999 | Batchelder et al. | |
| 5,893,404 A | 4/1999 | Mendez et al. | |
| 5,900,207 A | 5/1999 | Danforth et al. | |
| 5,932,055 A | 8/1999 | Newell et al. | |
| 5,939,008 A | 8/1999 | Comb et al. | |
| 5,943,235 A | 8/1999 | Earl et al. | |
| 5,968,561 A | 10/1999 | Batchelder et al. | |
| 6,004,124 A | 12/1999 | Swanson et al. | |
| 6,022,207 A | 2/2000 | Dahlin et al. | |
| 6,027,068 A | 2/2000 | Lantsman | |
| 6,054,077 A | 4/2000 | Comb et al. | |
| 6,067,480 A | 5/2000 | Stuffle et al. | |
| 6,070,107 A | 5/2000 | Lombardi et al. | |
| 6,085,957 A | 7/2000 | Zinniel et al. | |
| 6,095,323 A | 8/2000 | Ferguson | |
| 6,119,567 A | 9/2000 | Schindler et al. | |
| 6,127,492 A | 10/2000 | Nagashima et al. | |
| 6,129,872 A | 10/2000 | Jang | |
| 6,133,355 A | 10/2000 | Leyden et al. | |
| 6,162,378 A | 12/2000 | Bedal et al. | |
| 6,165,406 A | 12/2000 | Jang et al. | |
| 6,175,422 B1 | 1/2001 | Penn et al. | |
| 6,193,923 B1 | 2/2001 | Leyden et al. | |
| 6,214,279 B1 | 4/2001 | Yang et al. | |
| 6,228,923 B1 | 5/2001 | Lombardi et al. | |
| 6,257,517 B1 | 7/2001 | Babish et al. | |
| 6,261,077 B1 | 7/2001 | Bishop et al. | |
| 6,322,728 B1 | 11/2001 | Brodkin et al. | |
| 6,376,571 B1 * | 4/2002 | Chawla et al. | 522/64 |
| 6,572,228 B2 | 6/2003 | Kaga et al. | |
| 6,645,412 B2 | 11/2003 | Priedeman, Jr. et al. | |
| 6,685,866 B2 | 2/2004 | Swanson et al. | |
| 6,722,872 B1 | 4/2004 | Swanson et al. | |
| 6,730,252 B1 | 5/2004 | Teoh et al. | |
| 6,790,403 B1 | 9/2004 | Priedeman, Jr. et al. | |
| 6,869,559 B2 * | 3/2005 | Hopkins | 264/308 X |
| 2003/0090034 A1 * | 5/2003 | Mulhaupt et al. | 264/308 X |
| 2004/0245663 A1 * | 12/2004 | MacDougald et al. | 264/308 X |

FOREIGN PATENT DOCUMENTS

| | | |
|---|---|---|
| WO | WO 00/78519 | 12/2000 |
| WO | WO 02/06029 | 1/2002 |
| WO | WO 02/93360 | 11/2002 |
| WO | WO 2004/003823 | 8/2004 |

* cited by examiner

METHOD FOR THREE-DIMENSIONAL MODELING

CROSS-REFERENCE TO RELATED APPLICATION(S)

This application is a continuation-in-part of U.S. application Ser. No. 09/854,220, filed May 11,2001 and issued as U.S. Pat. No. 6,645,412, which is hereby incorporated by reference as if fully set forth herein.

BACKGROUND OF THE INVENTION

This invention relates to the fabrication of three-dimensional objects using additive process modeling techniques. More particularly, the invention relates to forming three-dimensional objects by depositing a first solidifiable material in a predetermined pattern so as to form a three-dimensional object, in coordination with the depositing of a second solidifiable material so as to provide a support structure for the three-dimensional object as it is being built.

Additive process modeling machines make three-dimensional models by building up a modeling medium, based upon design data provided from a computer aided design (CAD) system. Three-dimensional models are used for functions including aesthetic judgments, proofing the mathematical CAD model, forming hard tooling, studying interference and space allocation, and testing functionality. One technique is to deposit solidifiable modeling material in a predetermined pattern, according to design data provided from a CAD system, with the build-up of multiple layers forming the model.

Examples of apparatus and methods for making three-dimensional models by depositing layers of solidifiable modeling material from an extrusion head are described in Valavaara U.S. Pat. No. 4,749,347; Crump U.S. Pat. No. 5,121,329; Batchelder, et al. U.S. Pat. No. 5,303,141; Crump U.S. Pat. No. 5,340,433; Batchelder, et al. U.S. Pat. No. 5,402,351; Crump, et al. U.S. Pat. No. 5,503,785; Batchelder, et al. U.S. Pat. No. 5,764,521; Danforth, et al. U.S. Pat. No. 5,900,207; Batchelder, et al. U.S. Pat. No. 5,968,561; Stuffle, et al. U.S. Pat. No. 6,067,480; and Batchelder et al. U.S. Pat. No. 6,238,613; all of which are assigned to Stratasys, Inc., the assignee of the present invention. The modeling material may be supplied to the extrusion head in solid form, for example in the form of a flexible filament wound on a supply reel or in the form of a solid rod, as disclosed in U.S. Pat. No. 5,121,329. As described in U.S. Pat. No. 4,749,347, modeling material may alternatively be pumped in liquid form from a reservoir. In any case, the extrusion head extrudes molten modeling material from a nozzle onto a base. The extruded material is deposited layer-by-layer in areas defined from the CAD model. A solidifiable material which adheres to the previous layer with an adequate bond upon solidification is used as the modeling material. Thermoplastic materials have been found particularly suitable for these deposition modeling techniques.

Another layered-deposition technique for building models from a solidifiable material deposits droplets of modeling material from nozzles of a jetting head. Examples of apparatus and methods for making three-dimensional models by depositing layers of solidifiable modeling material from a jetting head are described, for example, in U.S. Pat. No. 5,136,515 to Helinski et al., and U.S. Pat. No. 6,193,923 to Leyden et al.

In creating three-dimensional objects by additive process techniques, such as by depositing layers of solidifiable material, it is the rule rather than the exception that supporting layers or structures must be used underneath overhanging portions or in cavities of objects under construction, which are not directly supported by the modeling material itself. For example, if the object is a model of the interior of a subterranean cave and the cave prototype is constructed from the floor towards the ceiling, then a stalactite will require a temporary support until the ceiling is completed. Support layers or structure may be required for other reasons as well, such as allowing the model to be removed from a base, resisting a tendency for the model to deform while partially completed, and resisting forces applied to a partially completed model by the construction process.

A support structure may be built utilizing the same deposition techniques and apparatus by which the modeling material is deposited. The apparatus, under appropriate software control, produces additional geometry acting as a support structure for the overhanging or free-space segments of the object being formed. Support material is deposited either from a separate dispensing head within the modeling apparatus, or by the same dispensing head that deposits modeling material. The support material is chosen so that it adheres to the modeling material. Anchoring the model to such support structures solves the problem of building the model, but creates the additional problem of removing the support structure from the finished model without causing damage to the model.

The problem of removing the support structure has been addressed by forming a weak, breakable bond between the model and the support structure, such as is described in U.S. Pat. No. 5,503,785. The '785 patent discloses a process by which a material that forms a weak, breakable bond with the modeling material is selected as either a support material or a release coating. Support material is deposited in layered fashion at the interface between the object and its support structure, or it is deposited in a layered fashion to form the support structure, in either case permitting the support structure to be broken away after formation of the object. When a release coating is used, it is deposited at the interface between the object and its support structure as a liquid, and forms a layer so thin that its geometry may be disregarded in the construction of the object.

In filament-fed Stratasys FDM® three-dimensional modeling machines of the current art, a filament strand of the modeling material (or support material) is advanced by a pair of motor-driven feed rollers into a liquifier carried by the extrusion head. Inside the liquifier, the filament is heated to a flowable temperature. The liquifier is pressurized by the "pumping" of the strand of filament into the liquifier by the feed rollers. The strand of filament itself acts as a piston, creating a pump. As the feed rollers continue to advance filament into the extrusion head, the force of the incoming filament strand extrudes the flowable material out from the dispensing nozzle where it is deposited onto a substrate removably mounted to a build platform. Stratasys FDM® three-dimensional modeling machines of the current art use as the modeling material an acrylonitrile-butadienestyrene (ABS) thermoplastic composition or a wax material. High-impact polystyrene has been used to create a break-away support structure. Additionally, Stratasys offers a material disclosed in pending U.S. patent application Ser. No. 10/019,160, sold under the name Waterworks™, for creating a soluble support structure.

An apparatus and method for layered deposition of high-strength engineering polymers to manufacture durable three-dimensional objects is disclosed in U.S. Pat. No. 6,067,480. Feed rods of the polymer are extruded from an extrusion cylinder using a piston which is displaced into the cylinder, providing high pressure extrusion accommodating of polymers having low melt flow and long chain lengths. The '480 patent discloses that feed rods of polycarbonate, polyaryletherketone and poly(methylmethacrylate) were successfully extruded using the extrusion cylinder apparatus. The '480 patent makes no disclosure of support materials.

Apparatus and methods for building three-dimensional models by layered deposition of high-temperature engineering thermoplastics are disclosed in pending U.S. patent application Ser. Nos. 09/804,401 and 10/018,673. These applications disclose the use of polycarbonates, polyetherimides, polyphenylsulfones, polysulfones, polyethersulfones and amorphous polyamides for building a three-dimensional model, but disclose no materials formulated for use in building a break-away support structure for such a model.

There is a continuing need to improve model strength and quality, by building models from high-performance engineering thermoplastics. Materials compatible with the modeling process are needed that will provide a suitable support structure for models built from high-performance materials.

BRIEF SUMMARY OF THE INVENTION

The present invention is a thermoplastic material containing silicone, and a method for using the material to build a three-dimensional model by layered deposition modeling. A method according to the present invention employs the thermoplastic material containing silicone as a support material for building a support structure for the model while it is under construction, with the silicone acting as a release agent to facilitate removal of the support structure from the model after its completion. The silicone release agent also exhibits good thermal stability, facilitating use of the material in high-temperature build environments. Advantageously, the silicone further serves to prevent a build-up of material in the nozzle of an extrusion head or jetting head of a three-dimensional modeling apparatus. Thus, the thermoplastic material of the present invention is used to advantage as a modeling material for building the model itself, in addition to its use as a support material.

For use as a support material, the thermoplastic material of the present invention preferably contains between about 1 and 10 weight percent silicone. For use as a modeling material, the thermoplastic material of the present invention contains a lesser amount of silicone, preferably between about 0.5 and 2 weight percent silicone. A base polymer of the thermoplastic material is selected based upon various physical, thermal and rheological properties demanded by the deposition modeling process.

DETAILED DESCRIPTION

Figure 1:
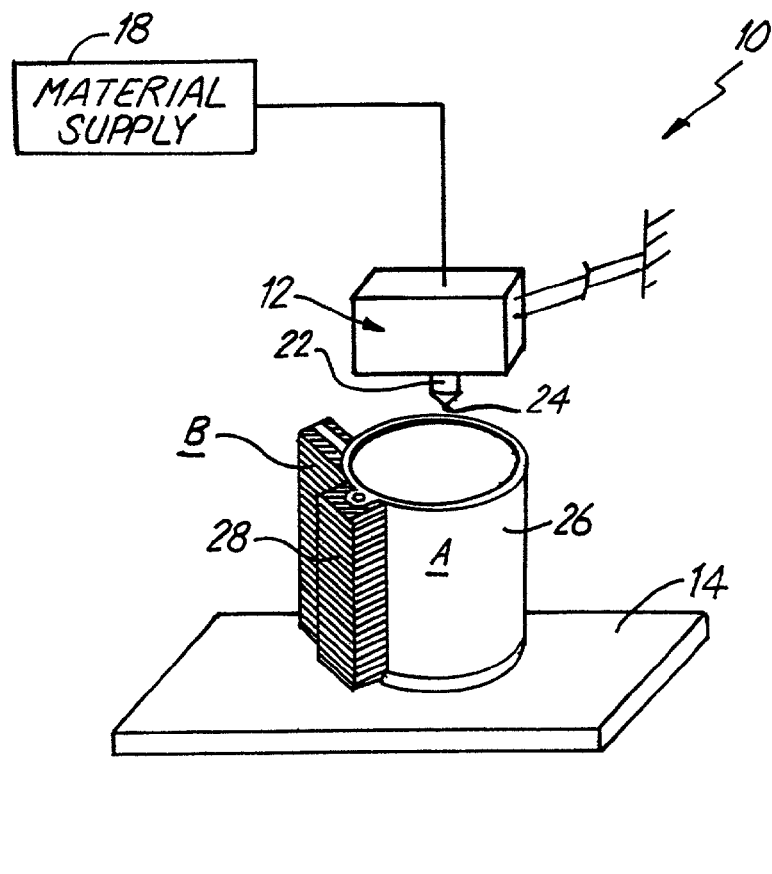
FIG. 1 is a diagrammatic illustration of a model and a support structure therefor formed using layered extrusion techniques.

The present invention is described with reference to a deposition modeling system of the type shown in FIG. 1. FIG. 1 shows an extrusion apparatus 10 building a model 26 supported by a support structure 28 according to the present invention. The extrusion apparatus 10 includes an extrusion head 12, a material-receiving base 14 and a material supply 18. The extrusion head 12 moves in X and Y directions with respect to the base 14, which moves in a vertical Z direction. The material supply 18 supplies a feedstock of material to the extrusion head 12. In the described embodiment, a solid feedstock of material is supplied to the extrusion head 12, and is melted in a liquifier 22 carried by the extrusion head 12. The liquifier 22 heats the feedstock material to a temperature slightly above its solidification point, reducing it to a molten state. Molten material is extruded through an orifice 24 of the liquifier 22 onto the base 14. The feedstock may take the form of a continuous filament, rods, slugs, pellets, granulations or the like.

The movement of the extrusion head is controlled so as to deposit material onto the base 14 in multiple passes and layers to build the three-dimensional model 26 and further to build the support structure 28 defined so as to physically support the model 26 as it is being built. The model 26 and its support structure 28 are build up on the base 14 within a build chamber (not shown) having an environment controlled so as to promote thermal solidification. A first layer of the deposited material adheres to the base 14 so as to form a foundation, while subsequent layers of material adhere to one another.

A modeling material A is dispensed to form the model 26, and a support material B is dispensed in coordination with the dispensing of modeling material A to form the support structure 28. For convenience, the extrusion apparatus 10 is shown with only one material supply 18. It should be understood, however, that in the practice of the present invention, the modeling material A and the support material B are provided to the extrusion apparatus 10 as separate feedstocks of material from separate material supplies. The extrusion apparatus 10 may then accommodate the dispensing of two different materials by: (1) providing two extrusion heads 12, one supplied with modeling material A and one supplied with support material B (such as is disclosed in the Batchelder '561 patent); (2) providing a single extrusion head supplied with both the modeling material A and the support material B, with a single nozzle for dispensing both materials (such as is shown in FIG. 6 of the Crump '329 patent); or (3) providing a single extrusion head supplied with both materials, with each material dispensed through a separate nozzle (such as shown in FIG. 6 of the Crump '785 patent).

In the described embodiment, the modeling material A and the support material B are deposited as substantially continuous "roads" in horizontal layers from an extrusion head, and are supplied to the extrusion head in solid form. It will be understood by those skilled in the art that the invention can be practiced with advantage in various other types of modeling machines as well, including those that employ a jetting head, and that the materials may alternatively be supplied to the extrusion head in liquid form.

Rheology of Modeling and Support Materials:

The modeling material A and support material B must satisfy a large number of modeling criteria for the particular modeling system in which they are used, relating generally to thermal properties, strength, viscosity and adhesion.

The modeling material A and support material B must have a melt viscosity suitable for the modeling process. Ideally, materials used for fused deposition modeling have low melt viscosity. The melt viscosity must be low enough at the extrusion temperature so that it can be extruded as a generally continuous road or bead. Also, the melt viscosity at the extrusion temperature must be low enough so that deposited roads or beads of material have little melt strength, allowing them to lay flat rather than curl up. Melt viscosity is lowered by increasing the temperature at which the material is extruded. Too high an extrusion temperature, however, can cause heated material sitting idle in the extruder to decompose. If decomposed, in the case of a filament-pump extruder that has no positive cut-off mechanism, the materials will drain uncontrollably from the liquifier into the build envelope, a condition referred to as "ooze". Further, a lower extrusion temperature reduces energy consumption, reduces heat generation and reduces the opportunity to degrade polymeric material.

In theory, the viscosity of a melt is related to the molecular weight of the material, and as it approaches the critical molecular weight, properties diminish. So, the lower limit on melt viscosity is defined as that at the critical molecular weight, but virtually all commercial grade polymers exceed the critical molecular weight to deliver good physical properties.

Melt viscosity may be measured by its inverse parameter, melt flow. A material used to build models in a Stratasys FDM® modeling machine which has a filament-pump extruder must have a high melt flow at the extrusion temperature, so as to be extruded as a continuous bead under a relatively low pressure of about 3000 psi or less. A desirable high melt flow for material deposited by a filament-pump type extruder is greater than about 5 gms/10 minutes, as measured by ASTM D1238, under a load of 1.2 kg at the extrusion temperature. Most preferably, the melt flow is between 5-30 g/10 minutes. A lower melt flow (higher viscosity) is suitable for high pressure extrusion, such as by the apparatus disclosed in U.S. Pat. No. 6,067,480.

To properly support the model under construction, the support material B must bond to itself (self-laminate). The support materials B must form a weak, breakable bond to modeling material A (co-laminate), so that it can be separated from the completed model without causing damage to the model. Where the support structure is built up from the base, support material B must additionally bond to the base.

To produce a dimensionally accurate model, the modeling and support materials must exhibit little shrinkage upon cooling in the conditions of the build envelope. Any shrinkage of the support material B must match that of the modeling material A. A shrink differential in the materials would cause stresses and bond failures along the model/support structure joint. Amorphous polymers typically have a shrinkage upon solidification of less than or equal to 0.010 inch/inch according to ASTM injection-molding test standards. The shrinkage characterisitic of amorphous polymers is acceptable for deposition modeling purposes, while crystalline polymers exhibit shrinkage too high for deposition modeling. Fillers may be added to the materials to reduce shrinkage. Crystalline additives may be added to the materials of the present invention, so long as they are added in an amount small enough so that the materials continue to exhibit the shrinkage characteristic of an amorphous polymer.

Selection of a particular modeling material A can be made according to the particular application of the finished model. The support material B must have sufficient mechanical strength in solid form to provide support to a model during its formation. The support material B must resist forces by the modeling material A, or the model will exhibit undesirable curling and deformation. A tensile strength of between 3000 psi and 12,000 psi is typically desired.

The modeling material A and support material B, when supplied in filament or rod form, must be strong enough to be shipped without breaking. When supplied in filament form, the materials must further have the strength and flexibility to be formed into a filament, be spooled and unspooled, and be fed through the extrusion apparatus without breakage. Similarly, materials supplied in filament form must have sufficient rigidity to not be deformed by compressive forces during feeding through the extrusion apparatus.

As to thermal properties, the modeling material A and support material B should have similar heat deflection properties, so that both materials can successfully be extruded into the same build chamber. As taught in U.S. Pat. No. 5,866,058, building the model in a chamber heated to a temperature higher than the solidification temperature of the thermoplastic or other thermally solidifiable modeling material, followed by gradual cooling, relieves stresses from the material. The stresses are annealed out of the model while is being built so that the finished model is stress free and has very little distortion. As is further taught in the '058 patent, a modeling material should have a glass transition temperature ($T_g$) higher than the temperature of the build chamber, so that the model does not become so weak that it droops. The preferred temperature of the build chamber is thus in a range between the solidification temperature of modeling material A and its creep relaxation temperature (creep relaxation temperature is defined as the point at which the stress relaxation modulus has dropped by a factor of ten from its low temperature limit). Likewise, the glass transition temperature of the support material B should be higher than the temperature of the build chamber, so that the support structure will not deform and will maintain structural fidelity of the model that it supports. It has been discovered through experimentation that the glass transition temperature (or heat deflection temperature) of the support material B should be within about 20° C. of the of the modeling material A, preferably with 15° C. The addition of fillers to the materials can have the effect of raising a material's glass transition temperature. In practice, glass transition temperature is indicated by the heat deflection temperature. Heat deflection temperature of the exemplary materials disclosed herein is measured by the DMA softening point of the material.

Exemplary polymers for use as modeling material A or support material B, or for use in formulating such materials, include polyethersulfones, polyetherimides, polyphenylsulfones, polyphenylenes, polycarbonates, high-impact polystyrenes, polysulfones, polystyrenes, acrylics, amorphous polyamides, polyesters, nylons, PEEK, PEAK and ABS. The selection of a particular material formulation is made based upon the various physical, thermal and rheological properties demanded by the deposition modeling process, such as have been described. A support material formulation is further chosen based upon the strength of the bond it will have the modeling material. The bond between the support material and modeling material must be strong enough to secure the model in place during its formation, but weak enough to permit removal of the support structure from the model after construction is complete.

It should be noted that while materials are referred to herein as either "modeling" or "support" materials, these materials may be interchanged so as to form a model using the so-called "support" material and to form a support structure for that model using the so-called "modeling" material. In a given build process, however, the material used for forming the model will desirably have properties that are superior to those of the material used to form its support structure (e.g., greater strength and toughness).

Testing of Materials:

The following are examples of material formulations which were tested for use as support materials in a very high-temperature modeling environment (i.e. build chamber temperature of 200° C. or greater). The material formulations were tested as support materials for a polyphenylsulfone modeling material. Specifically, in each case, the polyphenylsulfone modeling material is Radel® R 5600 NT (available from BP Amoco). This polyphenylsulfone resin has a heat deflection temperature of 236° C., and a melt flow in the range of 20-30 gms/10 min. at 400° C. under a 1.2 kg load. Example 3 embodies the present invention, while Example 1 and 2 are comparative examples.

All of the materials tested met the rheology criteria discussed above. In each case, techniques conventional in polymer chemistry were used to compound the component materials. The exemplary materials were successfully formed into modeling filament of a very small diameter, on the order of 0.070 inches, and used in a filament-fed deposition modeling machine. Materials according to the examples given were tested using filament-fed layered deposition modeling machines of the type disclosed in pending U.S. application Ser. Nos. 09/804,401 and 10/018,673, which are hereby incorporated by reference as if set forth fully herein.

EXAMPLE 1

Models of various sizes were built in a build chamber having a temperature of about 200-225° C., using the polyphenylsulfone modeling material and a support material comprising a blend of polyphenylsulfone and amorphous polyamide. In some cases, the support material further included polysulfone. Weight percent ranges of the various component materials were between about 60 and 90 weight percent polyphenylsulfone, and between about 10 and 40 weight percent amorphous polyamide blend, or between about 60 and 90 weight percent polyphenylsulfone, between about 1 and 40 weight percent polysulfone and between about 10 and 40 weight percent amorphous polyamide blend. A particular exemplary resin tested is a blend of 50 weight percent Radel® R 5600 NT polyphenylsulfone (available from BP Amoco), 25 weight percent Udel® P 1710 NT 15 polysulfone (available from BP Amoco), and 25 weight percent EMS TR 70 amorphous polyamide (available from EMS-Chemie AG of Switzerland). This resin has a heat deflection temperature of 224° C. and a melt flow similar to that of the modeling material. The support material was extruded from a liquifier having a temperature of about 350° C. to form a support structure for a model built using the polyphenylsulfone resin.

The support material according to this example was satisfactory for models that took less than about 20 hours to build, but failed for models that had a longer build time. It was observed that the support material exhibited thermally instability after about 20 hours in the build chamber. The thermally instability manifested by the material becoming dark and eventually blackening, and becoming strongly adhered to the model. Desirably, a material will survive build times of up to about 200 hours, to permit the building of large and complex parts. Thus, while the support material of the present example was found satisfactory for supporting small parts, it is not suitable for more general high-temperature use.

EXAMPLE 2

Test models were built in a build chamber having a temperature of about 200-225° C., using the polyphenylsulfone modeling material and a support material which comprised various resins of polyethersulfone, polyphenylsulfone or polyetherimide (i.e., Ultem™). These materials exhibited favorable thermal stability, but could not be broken away from the model. The support material containing polyphenylsulfone adhered very strongly to the model. The support material containing polyetherimide adhered fairy strongly to the model, and the support material containing polyethersulfone, while exhibiting the least adherence to the model, adhered too strongly for suitable use.

EXAMPLE 3

Large and small polyphenylsulfone models were built in a build chamber having a temperature of about 200-225° C., using a support material comprising a polyethersulfone base polymer and a silicone release agent. For convenience, commercially available compounds were used to provide a "masterbatch" containing silicone, which was compounded with the base polymer. Various masterbatches were tested, which included polypropylene, linear low-density polyethylene, and high-impact polystyrene. Additionally, various silicones were tested, ranging in viscosity from about 60,000 centistokes (intermediate viscosity) to 50 million centistokes (very high viscosity). The very high viscosity silicones have a high molecular weight, while the lower viscosity silicones have a lower molecular weight.

It was found that intermediate viscosity silicone was a much better release agent than the very high viscosity silicone, and that the high-impact polystyrene masterbatch released more easily from the polyphenylsulfone modeling material than did the other masterbatches tested. In a preferred embodiment, the masterbatch contained about 75 weight percent of a high-impact polystyrene copolymer and about 25 weight percent of a 60,000 centistoke (cSt) viscosity silicone. In this embodiment, the support material comprised between about 90-95 weight percent polyethersulfone, between about 3-8 weight percent high-impact polystyrene, and between about 1-3 weight percent silicone. This composition was demonstrated using BASF, Ultrason E-1010 polyethersulfone and Dow-Corning MB25-504 styrene butadiene copolymer containing hydroxy-terminated poly dimethyl siloxane (i.e. hydroxy-terminated silicone). This material was extruded from a liquifier having a temperature of about 420° C. to successfully form a support structure for a model built using the polyphenylsulfone resin. The support structure satisfactorily released from the model after its construction.

The support material of the present example exhibited a tensile strength of between 5000 psi and 12,000 psi, exhibited a shrinkage typical of amorphous polymers (less than 0.010 inch/inch), a melt flow in the range of about 5-30 gms/10 min. under a 1.2 kg load at a temperature of up to 450° C., and a heat deflection temperature of about 232° C.

Discussion of Results

It was demonstrated that adding a small amount of silicone to a base polymer weakened the bond between the base polymer and the modeling material, enabling use of the polymer to form a support structure that could be broken-away from the model. An intermediate viscosity silicone (on the order of about $10^4$-$10^5$ centistokes) provided good release characteristics, although it is expected that a variety of silicones can be used to advantage in the present invention.

As the silicone release agent exhibited thermal resistance at temperatures of 225° C. for over 200 hours, the present invention is particularly useful in supporting models made from high-temperature thermoplastics in a very hot environment. Heretofore, there have been no known materials suitable for building a support structure by layered deposition modeling techniques in an environment hotter than about 180° C.

While the composition of the present invention was demonstrated using a polyethersulfone base polymer, the silicone release agent can be added to a variety of other base polymers to likewise lessen adhesion of the support structure to the model. A base polymer is selected based upon various physical, thermal and rheological properties demanded by the deposition modeling process. For high-temperature processes, silicone added to a polyphenylsulfone or polyetherimide base polymer will exhibit good thermal stability. Other potential base polymers for use in various build environments include polyphenylenes, polycarbonates, high-impact polystyrenes, polysulfones, polystyrenes, acrylics, amorphous polyamides, polyesters, nylons, PEEK, PEAK and ABS. Where adhesion between a base polymer and a modeling material is higher, a greater amount of silicone can be added. A suitable amount of silicone will weaken but not destroy the bond between the support structure and the model, providing adhesion sufficient to support the model under construction. It is expected that up to about 10 weight percent silicone may be desired in some cases.

While a high-impact polystyrene co-polymer was used in demonstrating the present invention, such co-polymer is but one example of a copolymer which may be included in the composition of the present invention. The high-impact polystyrene masterbatch was used as a matter of convenience in compounding the silicone with the base polymer. Those skilled in the art will recognize that various masterbatches may be used (e.g., one made with the base polymer of the support material), that other techniques for compounding may be used which do not require a masterbatch (e.g., liquid silicone could be added directly to the base polymer), and that various other co-polymers may be included in the thermoplastic composition, in various amounts, to satisfy processing demands of a given application.

An unexpected benefit of the thermoplastic material containing silicone is that this material resisted build-up in the nozzle of the extrusion head liquifier. This attribute of the material, though unintended, is highly desirable. Typically, the liquifier of an extrusion-based layered deposition modeling machine needs to be replaced after extrusion of only about 7 pounds of material, due to an unacceptable build up of material in the nozzle. Resistance to clogging of the material containing silicone was observed to surpass that of any materials heretofore known in the art. The nozzles of liquifiers used to extrude the thermoplastic material containing silicone extruded over 40 pounds of the material before needing replacement. Nozzle life was thus extended by over 400 percent. Hence, silicone was demonstrated to provide the thermoplastic with characteristics desirable for modeling materials as well as support materials.

Resistance to nozzle clogging was demonstrated with compositions that included as little as 0.75 weight percent silicone. For modeling materials, the amount of silicone in the material may thus be kept very small, between about 0.5 weight percent and 2 weight percent, to prolong the liquifier life without degrading the strength of the modeling material. As will be recognized by those skilled in the art, the higher viscosity silicone, which has a lesser release ability, may be beneficial as an additive to the modeling material. As will be further recognized by those skilled in the art, where silicone is contained in both the modeling and support material, a reduced amount of silicone in the support material may be preferred.

Also as will be recognized by those skilled in the art, the modeling material A and support material B may include inert and/or active filler materials. The fillers can provide enhanced material properties which may be desirable depending upon the intended use of the resulting model. For instance, fillers can provide RF shielding, conductivity, or radio opaque properties (useful for some medical applications). Fillers can alternatively degrade material properties, but this may be acceptable for some uses. For instance, an inexpensive filler can be added to the modeling material A or support material B to decrease the cost of these materials. Fillers can also change thermal characteristics of the materials, for instance a filler can increase the heat resistance of a material, and a filler can reduce material shrinkage upon thermal solidification. Exemplary fillers include glass fibers, carbon fibers, carbon black, glass microspheres, calcium carbonate, mica, talc, silica, alumina, silicon carbide, wollastonite, graphite, metals and salts.

Filler materials which will assist in removal of the support structure can also be used in the composition of the present invention. For instance, a filler material that swells when contacted by water or another solvent will tend to be useful in breaking down the support structure. A filler material that evolves gas when contacted by water or another solvent will likewise tend to be useful in breaking down the support structure.

Those skilled in the art will recognize that innumerable other additives may also be to modify material properties as desired for particular applications. For instance, the addition of a plasticizer will lower the heat resistance and melt flow of a thermoplastic material. The addition of dyes or pigments can be done to change color. An antioxidant can be added to slow down heat degradation of material in the extruder.

The modeling and support materials A and B of this foregoing examples may be molded into filament, rods, pellets or other shapes for use as a modeling feedstock, or it may be used as a liquid feedstock without prior solidification. Alternatively, the mixture may be solidified and then granulated.

It is noted that the modeling material A and support material B of the foregoing examples are moisture sensitive. It has been demonstrated that exposure of these materials to a humid environment will significantly degrade model quality, thus, maintaining dry conditions is important. In order for the materials of the present invention to build accurate, robust models by fused deposition techniques, the material must dried. Particularly suitable apparatus for building up three-dimensional objects using the high temperature, moisture-sensitive materials of the present invention are disclosed in pending U.S. application Ser. Nos. 09/804,401 and 10/018,673, which are incorporated by reference herein. The '673 application discloses a modeling machine having a high-temperature build chamber, and the '401 application discloses a moisture-sealed filament cassette and filament path for supplying moisture-sensitive modeling filament in a filament-fed deposition modeling machine.

For the modeling material A and support material B of the foregoing examples, an acceptable moisture content (i.e. a level at which model quality will not be impaired) is a level less than 700 parts per million (ppm) water content (as measured using the Karl Fischer method). The '401 application discloses techniques for drying the filament provided in the a filament cassette. One method for drying the material is to place a cassette containing the material in an oven under vacuum conditions at a suitable temperature (between 175-220° F. is typical) until the desired dryness is reached, at which time the cassette is sealed. The cassette may then be vacuum-sealed in a moisture-impermeable package, until its installation in a machine. An expected drying time is between 4-8 hours to reach less than 300 ppm water content. Another method is to dry the material by placing packets of desiccant in the cassette without use of the oven. It has been demonstrated that placing packets containing Tri-Sorb-molecular sieve and calcium oxide (CaO) desiccant formulations in the cassette and sealing the cassette in a moisture-impermeable package will dry the material to a water content level of less than 700 ppm, and will dry the material to the preferred range of 100-400 ppm. This desiccant-only drying method has advantages over the oven-drying method in it requires no special equipment, and is faster, cheaper and safer than oven drying. Suitable Tri-Sorb-molecular sieve desiccant formulations include the following: zeolite, NaA; zeolite, KA; zeolite, CaA; zeolite, NaX; and magnesium aluminosilicate.

The '401 application further discloses a filament delivery system and an active drying system which will preserve the dryness of the material when it is loaded in the modeling machine. The drying system creates an active moisture barrier along a filament path from the cassette to the extrusion head, and purges humid air from the modeling machine. The drying system continuously feeds dry air or other gas under pressure to the filament path, disallowing humid air from remaining in or entering the filament path, and is vented at or near the end of the filament path.

Although the present invention has been described with reference to preferred embodiments, workers skilled in the art will recognize that changes may be made in form and detail without departing from the spirit and scope of the invention.

The invention claimed is:

1. An additive-process method for building a three-dimensional model comprising:
providing a solid feedstock of a first thermoplastic material to at least one extrusion head;
melting the solid feedstock of the first thermoplastic material in the at least one extrusion head;
depositing layers of the first thermoplastic material from the at least one extrusion head into a heated build chamber to form the three-dimensional model;
providing a solid feedstock of a second thermoplastic material to the at least one extrusion head;
melting the solid feedstock of the second thermoplastic material in the at least one extrusion head; and
depositing layers of the second thermoplastic material into the heated build chamber to form a support structure for the three-dimensional model, wherein the second thermoplastic material contains between about 0.5 and 10 weight percent of a silicone release agent.

2. The method of claim 1, wherein the second thermoplastic material contains less than about 2 weight percent of the silicone release agent.

3. The method of claim 1, wherein the second thermoplastic material contains greater than about 1 weight percent of the silicone release agent.

4. The method of claim 1, wherein the second thermoplastic material further comprises a base polymer selected from the group consisting of polyethersulfones, polyetherimides, polyphenylsulfones, polyphenylenes, polycarbonates, high-impact polystyrenes, polysulfones, polystyrenes, acrylics, amorphous polyamides, polyesters, nylons, PEEK, PEAK and ABS.

5. The method of claim 1, wherein the second thermoplastic material has a heat deflection temperature of greater than about 220° C.

6. The method of claim 5, wherein the second thermoplastic material has a melt flow in the range of about 5-30 gms/10 mm. under a 1.2 kg load at a temperature of up to 450° C., and a tensile strength of between about 5,000 psi and 12,000 psi.

7. The method of claim 6, wherein the second thermoplastic material further comprises a base polymer selected from the group consisting of polyethersulfones, polyphenylsulfones and polyetherimides.

8. The method of claim 1, wherein the silicone release agent has a viscosity on the order of about $10^4$-10 centistokes.

9. The method of claim 1, wherein the silicone release agent is hydroxy-terminated polysiloxane.

10. The method of claim 1, wherein the second thermoplastic material has a heat deflection temperature of greater than about 40° C., a melt flow in the range of about 5-30 gins/10 mm. under a 1.2 kg load at a temperature of up to 450° C., and a tensile strength of between about 3,000 psi and 12,000 psi.

11. The method of claim 1, wherein the build chamber has a temperature of between about 180° C. and 250° C.

12. An additive-process method for building a three-dimensional model and a support structure therefor, the method comprising:
feeding a modeling material in a solid state to a deposition modeling system;
melting the modeling material in the deposition modeling system;
depositing layers of the melted modeling material into a heated build chamber of the deposition modeling system to form the three-dimensional model;
feeding a support material in a solid state to the deposition modeling system, wherein the support material comprises a thermoplastic composition containing between about 1-10 weight percent of a silicone release agent;
melting the support material in the deposition modeling system;
depositing layers of the melted support material into the heated build chamber to form the support structure; and
separating the support structure from the three-dimensional object.

13. The method of claim 12, wherein the thermoplastic composition further comprises a base polymer selected from the group consisting of polyethersulfones, polyetherimides, polyphenylsulfones, polyphenylenes, polycarbonates, high-impact polystyrenes, polysulfones, polystyrenes, acrylics, amorphous polyamides, polyesters, nylons, PEEK, PEAK and ABS.

14. The method of claim 12, wherein the support material has a heat deflection temperature of greater than about 220° C.

15. The method of claim 14, wherein the support material has a melt flow in the range of about 5-30 gins/10 mm. under a 1.2 kg load at a temperature of up to 450° C., and a tensile strength of between about 5,000 psi and 12,000 psi.

16. The method of claim 15, wherein the thermoplastic composition further comprises a base polymer selected from the group consisting of polyethersulfones, polyphenylsulfones and polyetherimides.

17. The method of claim 13, wherein the base polymer is polyethersulfone and wherein the support material further comprises high-impact polystyrene.

18. The method of claims 16 or 17, wherein the modeling material comprises as a major component a polyphenylsulfone resin.

19. The method of claim 12, wherein the silicone release agent has a viscosity on the order of about $10^4$-$10^5$ centistokes.

20. The method of claim 12, wherein the silicone release agent is hydroxy-terminated polysiloxane.

21. The method of claim 12, wherein the support material has a heat deflection temperature of greater than about 40° C., a melt flow in the range of about 5-30 gms/10 mm. under a 1.2 kg load at a temperature of up to 450° C., and a tensile strength of between about 3,000 psi and 12,000 psi.

22. The method of claim 12, wherein the build chamber has a temperature of between about 180° C. and 250° C.

23. The method of claim 12, wherein the thermoplastic composition further comprises between about 60-99 weight percent polyethersulfone and the modeling material comprises as a major component a polyphenylsulfone resin.

24. The method of claim 12, wherein the thermoplastic composition further comprises between about 90-95 weight percent of a polyethersulfone base polymer, and wherein the modeling material comprises as a major component a polyphenylsulfone resin.

* * * * *

UNITED STATES PATENT AND TRADEMARK OFFICE
CERTIFICATE OF CORRECTION

PATENT NO. : 7,314,591 B2 Page 1 of 1
APPLICATION NO. : 10/187323
DATED : January 1, 2008
INVENTOR(S) : William R. Priedeman, Jr.

It is certified that error appears in the above-identified patent and that said Letters Patent is hereby corrected as shown below:

Under item (56) References Cited:
Column 2, Missing Reference on back side of Front Page under
Foreign Patent Documents, insert --WO    WO 00/62994    10/2000--

Column 12, Line 6, delete "gms/10 mm.", insert --gms/10 min.--

Column 12, Line 21, delete "gins/10 mm.", insert --gms/10 min.--

Column 12, Line 58, delete "gins/10 mm.", insert --gms/10 min.--

Column 13, Line 11, delete "gms/10 mm.", insert --gms/10 min.--

Signed and Sealed this

Twentieth Day of May, 2008

JON W. DUDAS
*Director of the United States Patent and Trademark Office*